July 2, 1957          E. SJÖKVIST ET AL          2,798,175
                      COMPENSATING WINDING
                      Filed June 22, 1954
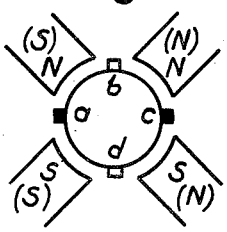
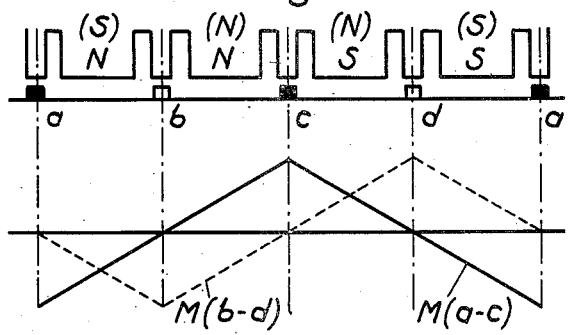
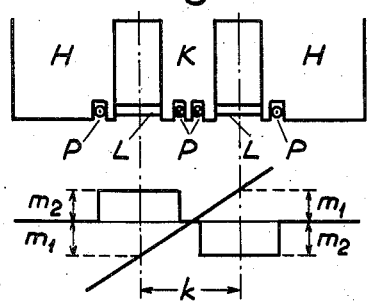
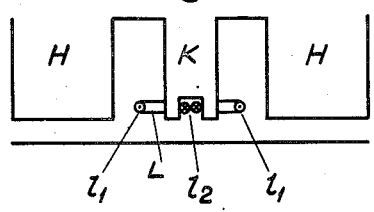
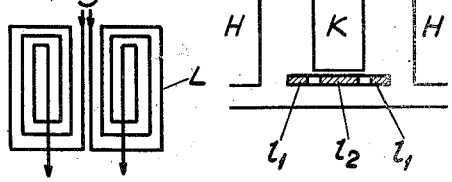
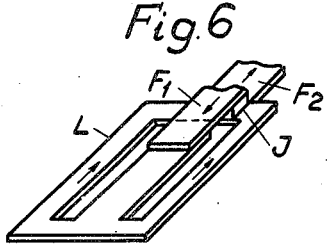
INVENTORS
Eric Sjökvist and
Erik Björck
BY
            Attorney.

United States Patent Office 2,798,175
Patented July 2, 1957

1

2,798,175

COMPENSATING WINDING

Eric Sjökvist, Vasteras, and Erik Björck, Enskede, Sweden, assignors to Allmanna Svenska Elektriska Aktiebolaget, Vasteras, Sweden, a corporation of Sweden Application June 22, 1954, Serial No. 438,551

Claims priority, application Sweden June 22, 1953

4 Claims. (Cl. 310—224)

In electric machines having a plurality of circuits independent of each other certain commutation difficulties are encountered in comparison with in a normal D. C. machine. This is due, inter alia, to the fact that the armature M. M. F. having its origin in the one circuit influences the commutation in the other circuit. The present invention has for its purpose to compensate, in a simple manner, the non-compensated M. M. F. originating from the other circuit and is characterized by winding turns within the interpolar gaps and possibly below the commutation poles, arranged in such a way that they suppress, entirely or partly, the said M. M. F.

The invention will now be described with reference to the accompanying drawing wherein:

Fig. 1 shows schematically a metadyne machine having two circuits independent of each other;

Fig. 2 shows a plain development of the machine and a diagram of the M. M. F.'s of the circuits of the machine;

Fig. 3 shows the arrangement of a compensating winding according to the invention;

Fig. 4 shows by way of example an embodiment of this winding;

Figs. 5 and 5a show still other arrangements of the compensating winding according to the invention, and Fig. 6 shows an embodiment of this winding in perspective view.

In Figs. 1 and 2, the brush axes $a$—$c$ and $b$—$d$ respectively for both circuits are indicated. The polarity of the one circuit is indicated between parentheses. As will be seen from Fig. 2, there are present two armature M. M. F.'s M($a$—$c$) and M($b$—$d$) originating from the two circuits, which M. M. F.'s mutually influence the commutation. If, for example, the section $a$—$b$—$c$ according to Fig. 2 is considered, within the commutation zone at the brush $b$ both an armature M. M. F. M($b$—$d$) is produced (indicated by dash lines in Fig. 2) the effect of which may be neutralized by a commutation winding arranged in a conventional manner about the commutation pole in front of $b$, and an armature M. M. F. M($a$—$c$)—(full lines in Fig. 2), the direction of which is different on both sides of the brush $b$. The purpose of the present invention is to bring about, within the commutation zone for the brush $b$, a compensation M. M. F. opposed to the last-mentioned M. M. F., which compensation M. M. F. therefore has to be directed

2 differently on both sides of $b$; i. e., if the said armature M. M. F. on one side of the symmetry plane of the commutation pole is positive and on the other side thereof is negative, the compensation M. M. F. must have opposite polarities at these places. Figs. 3 and 5 show a pair of main poles H and the associated commutation pole K. The compensating winding according to the invention is indicated by L and lies in slots P (Fig. 3). By suitably dimensioning the winding, the armature M. M. F. $m_1$ is substantially suppressed on the limit of the commutation zone $k$ by the opposed M. M. F. $m_2$. The winding may be arranged for example as shown in Fig. 4. In Fig. 5 an arrangement is shown, wherein the one axial side $l_1$ of the winding turn lies between one main pole H and the commutation pole K, and the other axial side $l_2$ is placed within the commutation pole. Each of the winding turns embraces at the highest half the commutation pole. Such a winding may be manufactured as shown in Fig. 6 from a copper sheet, wherein the connection members $F_1$ and $F_2$ are insulated from each other by an insulating member I. By suitably shaping the winding, it is possible to suppress, entirely or partly, the disturbing armature M. M. F.

We claim as our invention:

1. Arrangement for compensating the armature reaction in electric machines having main poles and commutation poles, and a plurality of circuits independent of each other for compensating the M. M. F. orginating from one of the circuits and appearing non-compensated within the commutation zone of another of the circuits, comprising compensating winding turns arranged symmetrically to the symmetry plane of the commutation poles and supplied with currents in such directions that, when the interfering armature M. M. F. on the one side of the symmetry plane of the commutation pole is positive and the other side is negative, the M. M. F.'s produced on those places are negative and positive, respectively.

2. Arrangement according to claim 1, comprising slots in the main poles and in the commutation poles, and in which the said compensating winding turns are arranged in pairs with the outer axial coil sides placed within the said slots in the main poles and with the inner axial coil sides placed within the said slots in the commutation poles.

3. Arrangement according to claim 1, in which the outer coil sides of the compensating winding turns are placed between the main poles and the commutation poles.

4. Arrangement according to claim 1, in which the compensating winding turns belonging to one commutation pole are shaped as a single flat winding element placed in the air gap.

References Cited in the file of this patent
FOREIGN PATENTS

| | | |
|---|---|---|
| 508,872 | Great Britain | July 7, 1939 |
| 885,275 | Germany | Aug. 3, 1953 |
| 152,368 | Switzerland | Apr. 16, 1932 |